G. DAUTEL.
COVER OR LID FOR COOKING POTS, SAUCEPANS, AND OTHER SIMILAR UTENSILS.
APPLICATION FILED MAY 28, 1919.
1,310,981.
Patented July 22, 1919.
2 SHEETS—SHEET 1.
Fig. 1
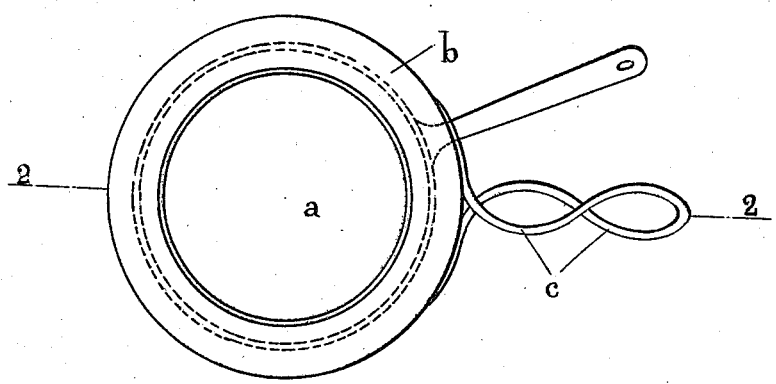
Fig. 2
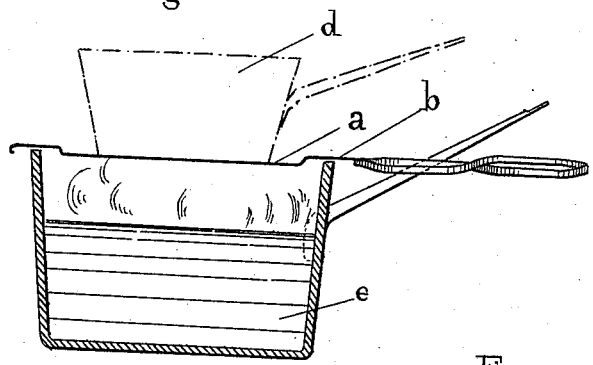
Fig. 5
Fig. 6
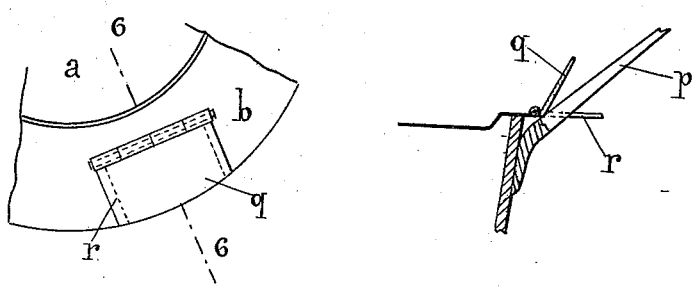
INVENTOR
GUSTAVE DAUTEL
BY Harmon and Harmon
ATTORNEYS

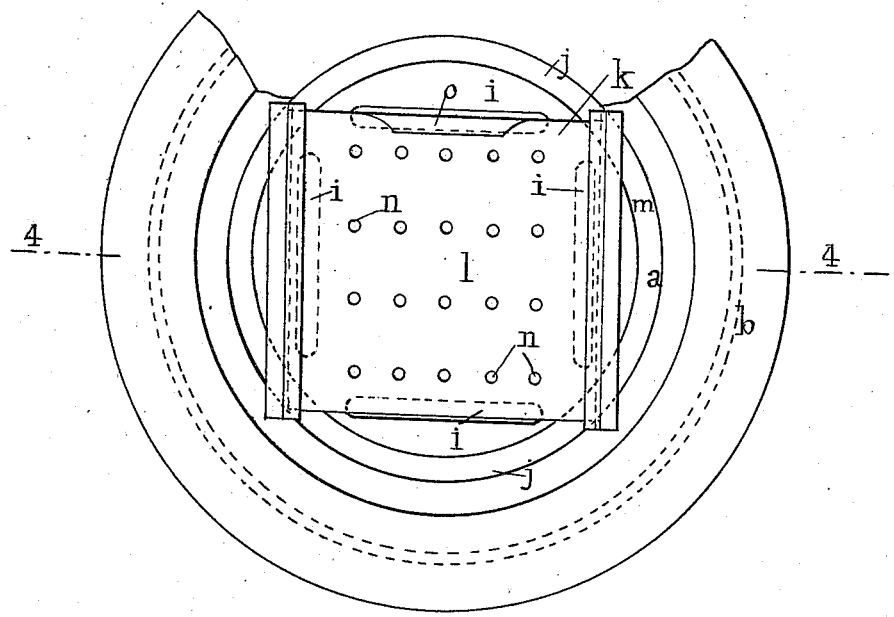

UNITED STATES PATENT OFFICE.

GUSTAVE DAUTEL, OF ANGERS, FRANCE.

COVER OR LID FOR COOKING-POTS, SAUCEPANS, AND OTHER SIMILAR UTENSILS.

1,310,981.  Specification of Letters Patent.  Patented July 22, 1919.

Application filed May 28, 1919. Serial No. 300,470.

*To all whom it may concern:*

Be it known that I, GUSTAVE DAUTEL, a citizen of the Republic of France, and a resident of Angers, Department of Maine and Loire, France, have invented certain new and useful Improvements in Covers or Lids for Cooking-Pots, Saucepans, and other Similar Utensils, of which the following is a specification.

This invention has for its object an improvement in the lids of cooking pots, saucepans and other similar utensils, designed to permit of utilizing the lid as a heater for dishes, plates, saucepans and other vessels.

The lids hitherto employed for covering cooking vessels present either an upwardly curved surface or else knobs or handles projecting therefrom, in such a way that it is impossible to place any vessel in stable equilibrium upon the cover.

The present invention relates to a lid presenting a central surface flat or slightly depressed in the form of a basin, provided with a rim sufficiently wide to bear upon the edge of the vessel to be covered, and provided with holding means, such as a handle, grip or stem, without any projection capable of preventing the placing of a vessel upon the central surface of the lid.

The lid thus formed may support a vessel of any kind, plates, dishes, pots or the like, and may serve as a heater for utilizing the waste heat from the vessel which it covers.

A form of construction of the object of the invention is represented by way of example upon the accompanying drawing, in which:

Figure 1 shows a plan view of the lid.

Fig. 2 is a section on line 2—2 of Fig. 1.

Fig. 3 is a view from beneath, showing a modification of the lid.

Fig. 4 is a section on line 4—4 of Fig. 3.

Fig. 5 represents the detail of an arrangement allowing the use of the improved lid upon vessels having a projecting handle.

Fig. 6 is a section on line 6—6 of Fig. 5.

The lid according to the present invention comprises essentially a central part $a$ flat or slightly depressed in the form of a basin and an exterior rim $b$ sufficiently wide to allow the lid to adapt itself to vessels of somewhat different diameters. This lid is provided with a handle or grip $c$ which is arranged so as not to be inconvenient when it is desired to place a vessel $d$ upon the lid. This handle may be made by means of a round metal wire twisted into a figure of eight as shown in the drawing and soldered or otherwise secured upon the edge $b$ of the lid. It may also be pressed in one piece with the lid or again be formed from a metal sheet suitably bent and turned back upon the lid so as not to create a projection.

It will be seen that this arrangement allows the lid, when it is already in use to cover a sauce-pan $e$, for example, to receive any other kind of vessel $d$, and therefore to be used as a heater for cooking or heating food, for the preparation of certain foods which will not stand the direct heat of the fire, and the like purposes.

In certain cases it may be advantageous to facilitate the transfer of heat between the vapor which escapes from the sauce-pan $e$ covered by the lid and the vessel $d$ placed upon the lid. It will then be desirable to provide the flat portion $a$ of the lid with a certain number of holes $g$ (see Figs. 3 and 4) by which the vapor may pass. In order to prevent resistance from the vapor condensed upon the underside of the vessel $d$ returning to the vessel $e$ together with dirt or impurities with which the said underside may be soiled, the holes $g$ are formed by punching or pressing the lid $a$ in such a way as to present a bur or projection $h$ (Fig. 4) above the surface $a$, which prevents the water from returning into the vessel $e$. Moreover so that the underside of the vessel $d$ shall not rest directly upon the holes $g$, there are provided ridges or projections $i$ formed by the pressing of the lid, upon which the underside of the vessel rests; these ridges which may be rectilinear or curvilinear, are preferably interrupted for example at $k$ to allow the condensed water to spread over the whole surface $a$ of the lid. The latter may also have grooves or depressions $j$ capable of receiving a portion of this water.

The holes $g$ may be masked at will by means of a shutter $l$ which slides in guides $m$ with which the lower face of the lid is provided; the shutter is perforated with holes $n$ corresponding to the holes $g$, and carries upon one of its free edges a grip or projection $o$ whereby it may be operated.

It may happen that some vessels $e$ to be covered present a handle $p$ fixed very near the edge which would obstruct the fitting of the lid. The latter may therefore be provided with a flap $q$ (Figs. 5 and 6) covering a notch $r$ in the rim $b$ and capable of being turned aside for the passage of the handle *p* of the vessel to be covered. This flap may be mounted for example on a hinge as shown in the drawing or in any other way.

Claims:

1. A lid for cooking vessels comprising a rim adapted to rest upon the side walls of the vessel to be covered, a depressed central portion to receive a vessel to be heated, and a cover handle lying substantially in the plane of the rim and secured to the latter at a point outside the area of the vessel walls on which the cover rests.

2. A lid for cooking vessels comprising a rim adapted to rest upon the side walls of the vessel to be covered, a central area having upwardly projecting punchings to afford steam outlets, and a gutter to receive the condensate.

3. A lid for cooking vessels comprising a rim adapted to rest upon the side walls of the vessel to be covered, a central area having upwardly projecting punchings to afford steam outlets, and a gutter surrounding the punchings to receive the condensate.

4. A lid for cooking vessels, comprising a central surface adapted to support a vessel to be heated, holes projecting outwardly in said surface, an external rim surrounding said surface, and holding means fixed on said rim.

5. A lid for cooking vessels, comprising a central surface adapted to support a vessel to be heated, holes in said surface projecting outwardly therefrom, projections on said surface of greater height than the projection of said holes, an exterior rim, and holding means fixed on said rim.

6. A lid for cooking vessels, comprising a central surface adapted to support a vessel to be heated, holes in said surface projecting outwardly therefrom, projections on said surface of greater height than the projection of said holes, depressions in said surface, an exterior rim, and holding means fixed to said rim.

7. A lid for cooking vessels, comprising a central surface adapted to support a vessel to be heated, holes in said surface projecting outwardly therefrom, a movable shutter upon the surface provided with holes corresponding to the holes in said surface, an exterior rim and holding means fixed to said rim.

8. A lid for cooking vessels, comprising a rim adapted to rest upon the side walls of the vessel to be covered, and notched at a point outside said side walls to accommodate the handle of said vessel, together with a removable flap normally closing said notch.

In testimony whereof I have signed my name to this specification.

GUSTAVE DAUTEL.

Witnesses:
H. GENEAU,
VIDALEINY.

Copies of this patent may be obtained for five cents each, by addressing the "Commissioner of Patents, Washington, D. C."